C. GREGORY.
TRACTOR.
APPLICATION FILED JULY 24, 1918.
1,307,904.
Patented June 24, 1919.
2 SHEETS—SHEET 1.
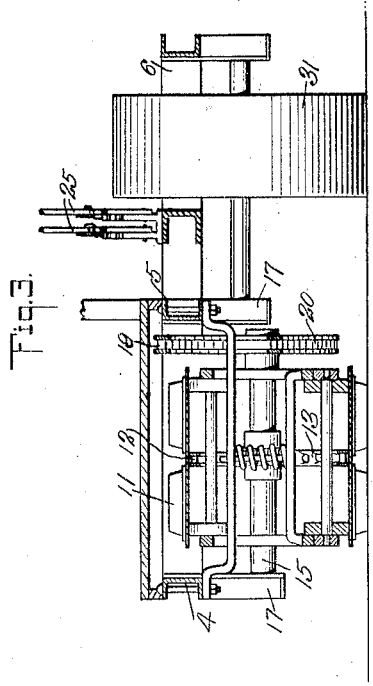
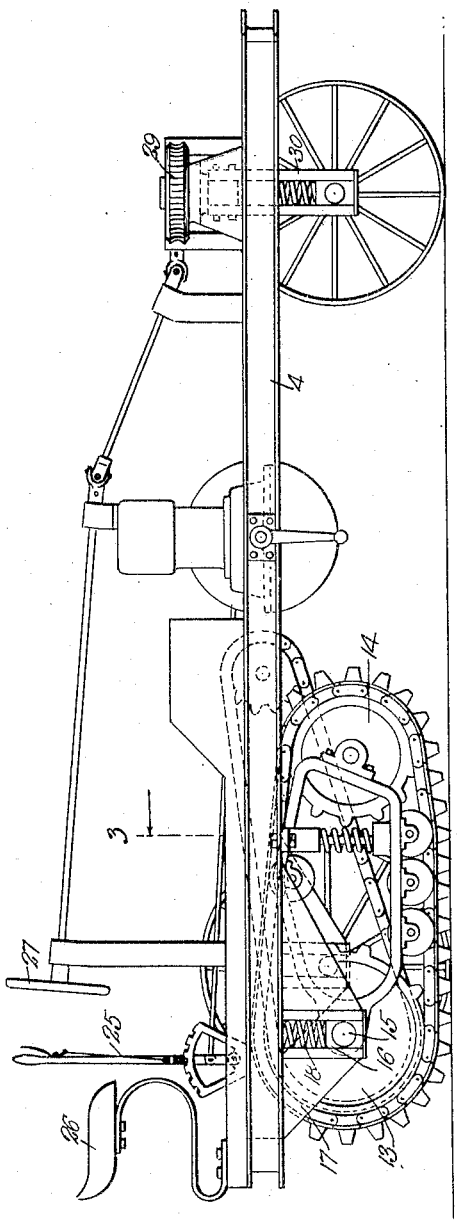
WITNESSES
INVENTOR
Carl Gregory
BY
ATTORNEYS C. GREGORY.
TRACTOR.
APPLICATION FILED JULY 24, 1918.
1,307,904.
Patented June 24, 1919.
2 SHEETS—SHEET 2.
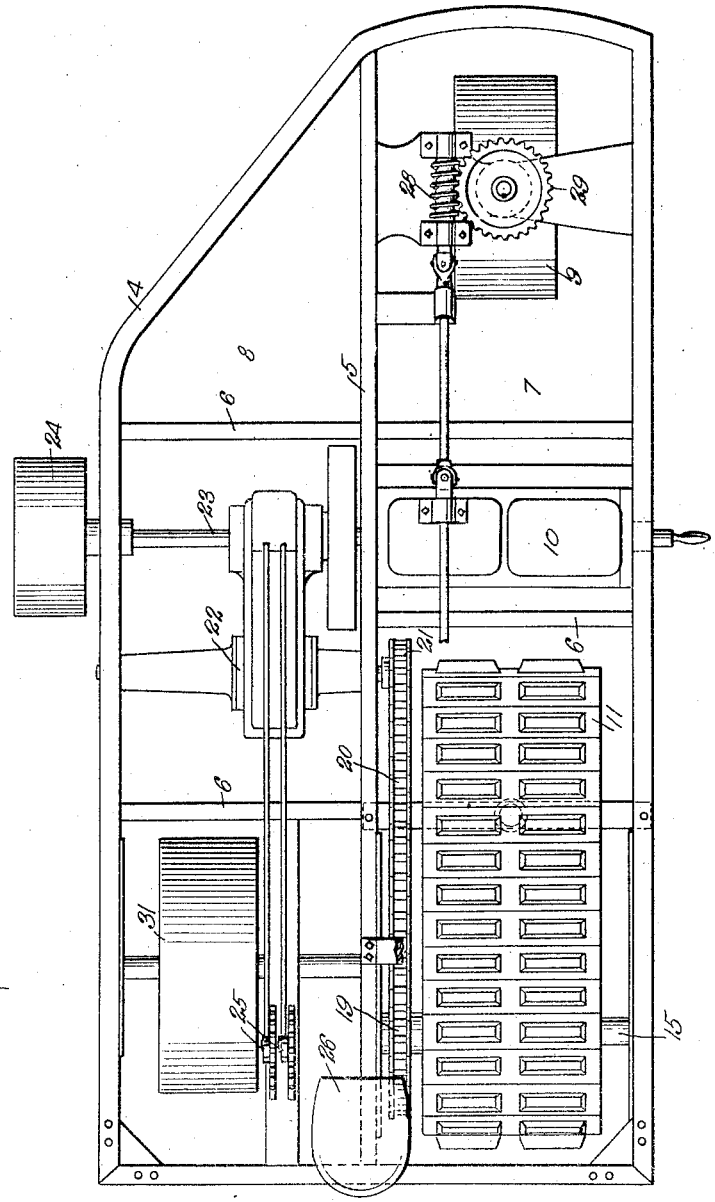
WITNESSES
Frederick Diehl.
B Joffe
INVENTOR
Carl Gregory
BY
ATTORNEYS

UNITED STATES PATENT OFFICE.

CARL GREGORY, OF PETALUMA, CALIFORNIA.

TRACTOR.

1,307,904. Specification of Letters Patent. Patented June 24, 1919.

Application filed July 24, 1918. Serial No. 246,547.

*To all whom it may concern:*

Be it known that I, CARL GREGORY, a citizen of the United States, residing at Petaluma, in the county of Sonoma and State of California, have invented a new and Improved Tractor, of which the following is a full, clear, and exact description.

My invention relates to tractors of the type provided with a caterpillar drive, and the object of the invention is to provide a simple, inexpensive and small tractor.

With the above and other objects in view, the nature of which will more fully appear as the description proceeds, the invention consists in the novel construction, combination and arrangement of parts as herein fully described, illustrated and claimed.

In the accompanying drawings, forming part of the application, similar characters of reference indicate corresponding parts in all the views.

Figure 1 is a side elevation of the tractor embodying my invention;

Fig. 2 is a plan view of a tractor; and

Fig. 3 is a section on line 3—3, Fig. 1.

Referring to the drawings, 4 is a frame, preferably of channeled iron reinforced by a central longitudinal member 5 and by transverse beams 6. The longitudinal member 5 divides the frame into two longitudinal sections 7 and 8. The section 7 accommodates at the front a turning wheel 9. In the middle of this section is located an engine 10, and between the engine and the rear of the frame, a caterpillar 11 the tread of which is provided with an endless chain 12 encompassing a driven sprocket 13 and an idler 14. The driven sprocket 13 is constrained to revolve with a shaft 15, the bearings 16 of which are housed in an extension 17 forming part of the frame and also the member 5.

Suitable springs 18 are provided in the extension to form a yielding support for the frame on the shaft 15. The shaft 15 carries also a sprocket 19 constrained to revolve with the shaft and which is engaged by an endless chain 20, the chain engaging a pinion 21 coupled to a motion transmission mechanism 22, which motion transmission mechanism is located in the section 8 of the frame.

The transmission mechanism 22 is driven from the shaft 23 coupled to the engine and which shaft carries a belt pulley 24 disposed outside of the frame 4. The transmission mechanism is operable from levers 25 located near the rear of the frame in proximity of a seat 26, also located at the rear of the frame. Near the seat is also mounted a steering wheel 27 by means of which a worm 28 may be revolved to operate a worm wheel 29 constrained to revolve with a yoke 30 in which the turning wheel 9 is yieldingly mounted. In the rear part of section 8 of the frame an idler wheel 31 is provided which coöperates with the caterpillar mechanism, the specific structure of which has been brought out in another application for Letters Patent.

I claim:

1. A tractor comprising a frame having two longitudinal sections, a caterpillar mechanism in the rear of one section of the frame, a supporting wheel in the other section of the frame opposite the caterpillar, a motor in the same section of the frame as the caterpillar and in front of the same, a shaft in the section of the frame with the supporting wheel and coupled with the motor, a transmission mechanism in rear of said shaft and operated thereby, controlling levers for the transmission mechanism, gearing between the transmission mechanism and one of the shafts of the caterpillar, and a steering wheel in the front of the frame.

2. In a tractor, a frame having two longitudinal sections, a caterpillar mechanism in one section at the rear thereof, said caterpillar having a sprocket wheel on one of its shafts, a supporting wheel in the other section of the frame opposite the caterpillar, a motor in the section of the frame with the caterpillar in front of the same, a shaft in the section of the frame with the supporting wheel and coupled with the motor, a transmission mechanism in rear of said shaft, a sprocket wheel in the section of the frame with the caterpillar and coupled with the transmission mechanism, and chains passing over said sprocket wheel and the one of the caterpillar shafts.

3. In a tractor, a frame having a longitudinal brace dividing the frame into two longitudinal sections, transverse braces reinforcing said longitudinal sections of the frame, a caterpillar mechanism in one of the sections, a supporting wheel in the other of the sections beside the caterpillar, a wheel mounted to turn in the forward part of the section in which the caterpillar mechanism is mounted, means for controlling the turning movement of the wheel whereby the tractor may be steered, a prime mover in the same section with the caterpillar between the caterpillar and the wheel mounted to turn, motion transmission means in the other section of the frame, means connecting the motion-transmission means to the prime mover and, means for operating the caterpillar mechanism from the transmission mechanism.

CARL GREGORY.